Nov. 5, 1929.  J. H. TRITZ  1,734,927
SPRAY MIST WASHING APPARATUS
Filed Sept. 9, 1926   2 Sheets-Sheet 2

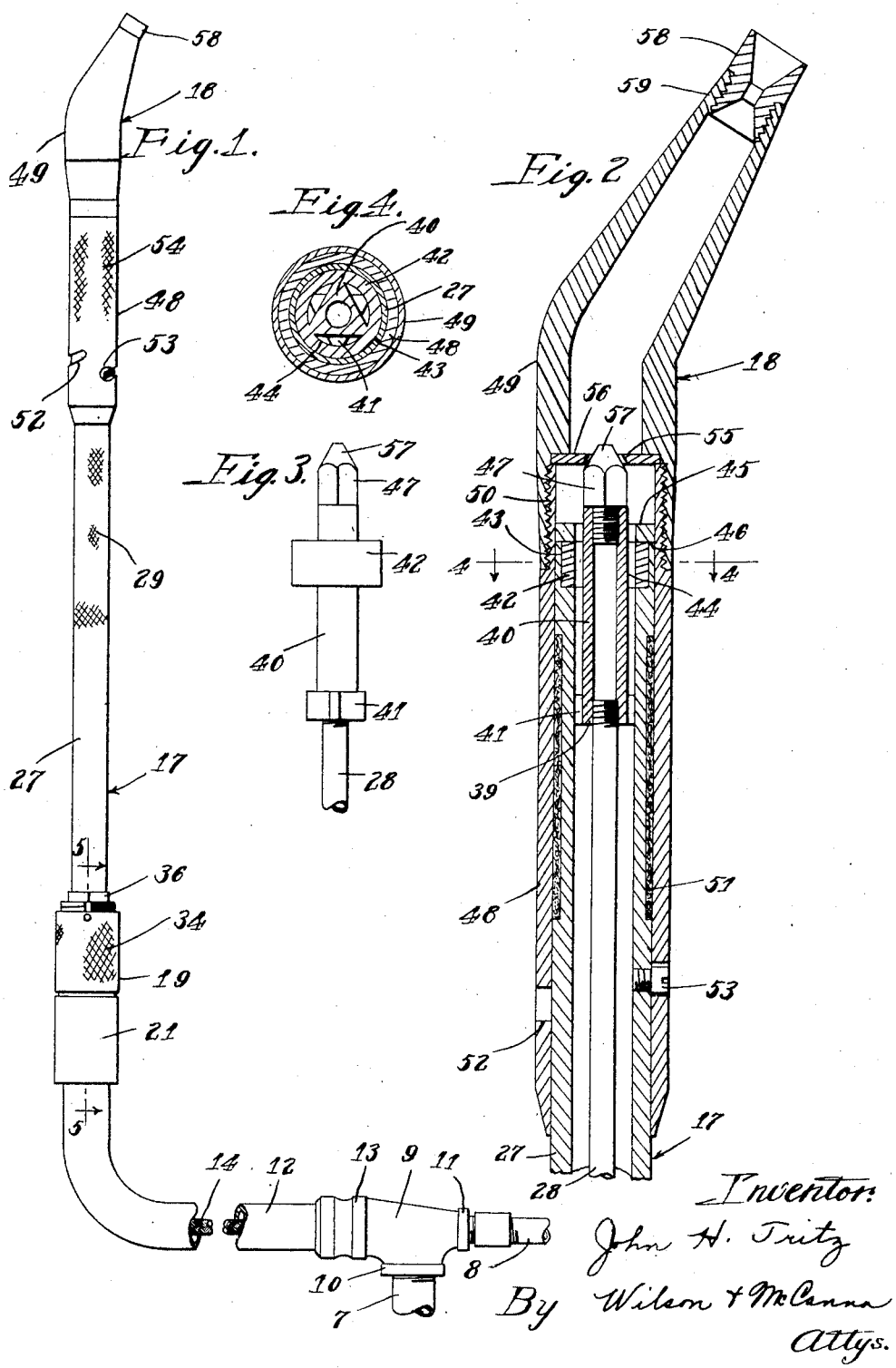

Inventor
John H. Tritz
By Wilson & McCanna
Attys.

Patented Nov. 5, 1929

1,734,927

UNITED STATES PATENT OFFICE

JOHN H. TRITZ, OF CLINTON, IOWA, ASSIGNOR TO COTTA TRANSMISSION CORPORATION, OF ROCKFORD, ILLINOIS, A CORPORATION OF ILLINOIS

SPRAY-MIST WASHING APPARATUS

Application filed September 9, 1926. Serial No. 134,428.

This invention relates to liquid spraying apparatus generally and is more particularly concerned with a spray mist washing apparatus designed for use in garages and other places in the washing of automobiles, but obviously capable of other similar uses.

One of the principal objects is to provide a light and serviceable spray nozzle in an apparatus of this kind capable of quick and easy adjustment from a full stream of water to a fog mist of air and water or air alone. A special feature of the nozzle lies in its capacity for turning the nozzle about by a handle portion to direct the spray in any direction, such adjustment being made without affecting the consistency of the spray in any way and making the apparatus more adaptable to service requirements.

Another object is to provide a spray mist washing apparatus where the extension hose to the nozzle is flexible to facilitate the handling of the nozzle and enable faster work, the extension hose having the compressed air hose extended inside the same thus making for less bulk and making the handling of the nozzle less cumbersome. This construction also produces a spray of a more satisfactory uniformity than can possibly be produced where the air and water are brought together at some point farther removed from the work, the spray in such cases usually being in the form of solid slugs of water interspersed with the exhausting air.

The invention is illustrated in the accompanying drawings wherein—

Fig. 1 is a side view of the nozzle or washing gun, as it is commonly termed, illustrated in connection with the extension hose having connection with the pipes leading to the sources of air and water under pressure;

Fig. 2 is a longitudinal axial section through the nozzle proper on an enlarged scale;

Fig. 3 is an isolated elevational detail of the internal air nozzle with its hollow plug element which serves to keep the air tube centered within the water tube and also provides a rotary bearing permitting the rotation of the handle proper with respect to the air tube;

Fig. 4 is a cross-section taken on the line 4—4 of Fig. 2;

The same reference numerals are applied to corresponding parts throughout the views.

The apparatus of the present invention is designed for general cleaning purposes and has been found to be highly efficient in the cleaning off of mud and dirt from the body and running gear of automobiles which could hardly be dislodged in any other way. The water being so finely divided permeates the crust and it is found that the matter will then easily drop off. There is absolutely no possibility of injury to the surface cleaned. Depending on the requirements of the job the consistency of the spray is variable until the best results are secured. In the present case the apparatus is quickly adjustable from a full stream to a cloudy or foggy mist of air and water or air alone. Obviously, any washing solution other than water may be used if desired.

Figure 6:
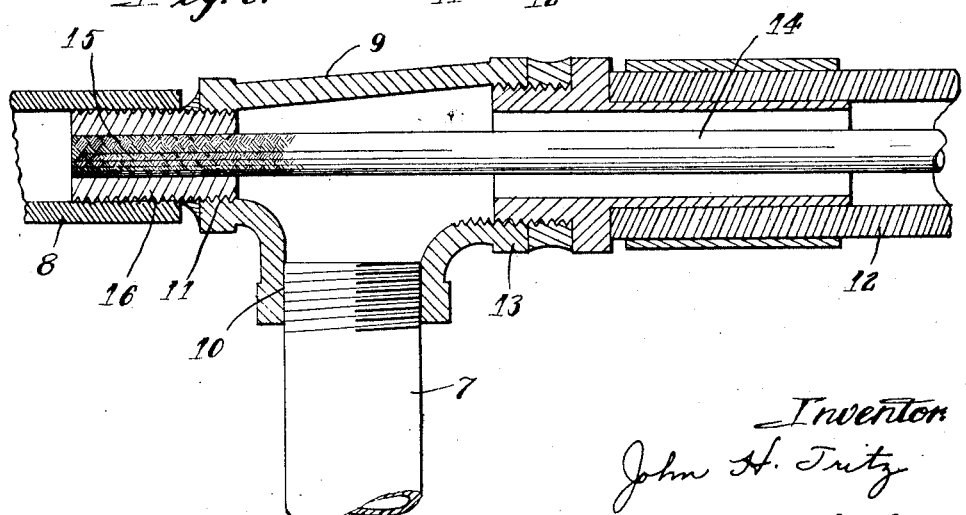
Fig. 6 is an enlarged sectional detail showing the connection of the extension hose with the water and air lines.

The apparatus of the present invention has connection with sources of water under pressure and compressed air through pipes 7 and 8, respectively. These pipes are connected with a reducing T-fitting 9, as shown in Figs. 1 and 6, the water line communicating with the intermediate opening 10, while the air line communicates with the smaller end opening 11. An extension hose 12 is connected to the larger end opening 13 of the T-fitting and is flexible as indicated in Fig. 1 and of any suitable or desired length to suit any specified requirements. Any suitable form of clamp or the like may be provided to insure a tight connection between the hose 12 and the T-fitting. Another flexible extension hose 14 is extended inside the hose 12 and communicates with the air line by being sweated or otherwise suitably secured at 15 in a nipple 16 threading in the T-fitting 9 and having the air line 8 connected therewith. The hose 14, as indicated in Fig. 6, is a flexible metallic hose such as is well known in the industries and generally available. The disposing of one hose within the other makes for greater flexibility and less bulk; consequently the workman is less encumbered in handling the same about the work and is, therefore, able to work faster and accomplish more than is the case with certain other apparatus using a double line with the two hoses disposed side by side.

Figure 5:
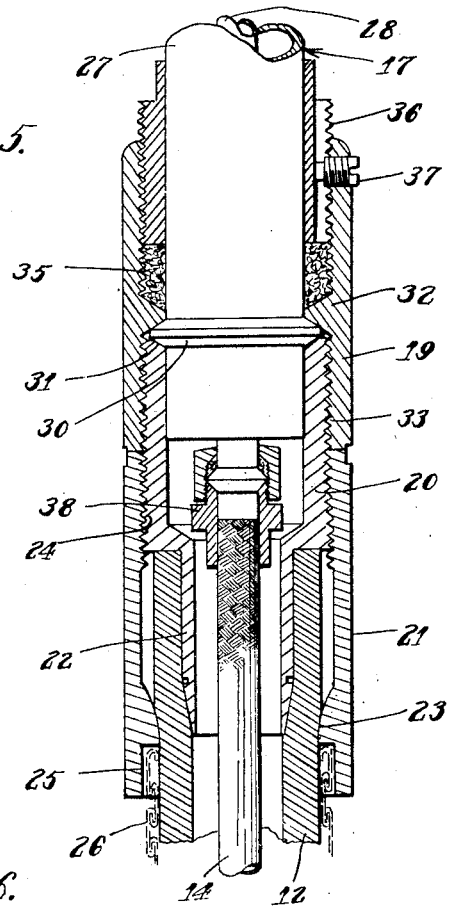
Fig. 5 is an enlarged longitudinal axial section of the swivel connection between the handle proper and the extension hose.

The extension hose 12 with the hose 14 inside the same terminates in a rigid handle 17 having the nozzle 18 on the outer end thereof. A union composed of three parts 19, 20, and 21, as shown in Fig. 5, comprises the connection between the handle 17 and the extension hose 12. The part 20 is a male element having a ferrule end 22 fitting within the hose 12 with a tight fit. The part 21 is a female element having an annular shoulder 23 to wedge the hose 12 between the ferrule 22 and the shoulder 23 when the part 21 is threaded to the part 20 at 24. The part 21 is counterbored at 25 to receive suitable armoring for the hose 12 indicated at 26. The handle 17, as clearly appears in Figs. 2 and 5, comprises an external rigid or inflexible tubular section 27 having an internal rigid or inflexible tubular section 28 extending therethrough. The tube 27 forms the handle proper and is suitably knurled as at 29 whereby to turn the same and with it the nozzle 18 in any desired direction. The tube 27 has a ring 30 sweated or otherwise suitably secured thereto seating at 31 in the counter-bored end of the part 20. A complementary seat 32 is provided inside the part 19 which threads, as shown at 33, onto the part 20. The exterior of the part 19 may be suitably knurled, as indicated at 34, to make it easy to hold the same and thereby facilitate the turning of the tube 27 as just above described. Packing material is provided at 35 in a counter-bored recess in the part 19 and is placed under compression by a gland nut 36 to avoid the likelihood of leakage. The gland nut is in turn secured in its proper state of adjustment by a set screw 37. In assembling the parts the gland nut 36 is tightened only to an extent where the tube 27 may still turn fairly freely in the seats 31 and 32. The tube 28 communicates with the extension hose 14 through a suitable union at 38.

The tube 28 threads at 39 in a hollow plug element 40 mounted in the outer end of the tube 27. The plug 40 has a spider portion 41 for positioning the tube 28 centrally within the tube 27 and has a bearing portion 42 having a working fit in a counter-bore 43 in the end of the tube 27. The bearing portion 42 is cut out, as indicated at 44, to afford a clear passageway for water about the plug 40 through the tube 27. The plug 40 is retained in the end of the tube 27 by a ring 45 sweated or otherwise suitably secured at 46 to the end of the tube 27. In this way the plug 40, and with it the nozzle 47, is held in proper determined endwise relationship with the tube 27 as the ring 45 provides an end thrust bearing for the bearing portion 42 of the plug element in an obvious manner. It will, therefore, apear that the tube 28 and with it the plug 40 and nozzle 47 will remain stationary when the tube 27 or handle is turned in the manner previously described. The bearing portion 42, in other words, rotates in its bearing 43.

The tube 27 has the nozzle 18 swiveled thereon for the purpose of varying the discharge of water and thereby determining the consistency of the spray. The nozzle 18 is of a two part construction and comprises an inner shank portion 48 and an outer head portion 49 suitably threaded together as at 50. The shank 48 has a working fit on the tube 27 and has the joint therebetween sealed by asbestos wicking or other suitable packing material at 51. The shank 48 has a spiral slot 52 provided therein in which is engaged the head of a cap screw 53 threaded in the tube 27. The shank 48 is also knurled, as indicated at 54, to facilitate turning the nozzle as a whole relative to the handle, that is, the tube 27. In the turning of the nozzle the relationship between the nozzle 47 and a port 55 is changed. The port 55 is provided in a disk 56 assembled between the parts 48 and 49 of the nozzle 18. The outer end of the nozzle 47 is tapered as indicated at 57 and corresponds with the taper of the opening 55 so that an annular opening of uniform area is provided about the nozzle 47 through which water under pressure from the tube 27 is arranged to be discharged. Due to the form of the opening the discharge of water resembles a cone into the apex of which air is discharged from the nozzle 47, thus breaking up the water in a very effective manner. The head portion 49 of the nozzle 18 is provided with a tip 58 having a Venturi shaped bore, as indicated at 59, in which the water and air are further intimately brought into contact to insure the finer division of the water. The flaring discharge end of the bore causes the spray to be somewhat spread and makes the action of the spray less localized, more uniform and generally more satisfactory.

In operation, it is evident that the turning of the handle in directing the nozzle in no way affects the consistency of the spray discharged. as the adjustment of the nozzle 18 is not altered thereby nor is the relationship of the nozzle 47 to the water discharge port 55 changed in the slightest degree. Depending on the particular job encountered, the nozzle 18 will be adjusted to secure a spray of the desired consistency. Thereafter the handle may be turned any number of times without affecting this adjustment. When the job is completed and the spray is no longer desired, a quick turn of the nozzle 18 will suffice to shut off the water. The air, however, will continue to flow until the compressor is shut off or the valve in the compressed air line leading to the apparatus is closed. In certain cases, the apparatus is used with the air alone being discharged, as for example to clear off excess moisture from a newly cleaned surface to hasten the drying.

It is believed that the foregoing conveys a clear understanding of the objects prefaced above and while I have illustrated but a single working embodiment it should be understood that changes might be made in certain details of construction without departing from the spirit and scope of the invention as expressed in the appended claims.

I claim:

1. In a liquid spraying device, an external metallic tubular section, an internal metallic tubular section co-axially disposed with respect thereto, a hollow plug element connected with said internal section having a spider portion for co-axially aligning the internal section with the external section and having a bearing portion rotatably supported within said external section, both said spider portion and said bearing portion permitting the passage thereby of fluid through said external section, a nozzle mounted on the outer end of said plug and having an outer tapered discharge end, and a second nozzle swiveled on the external section and providing a discharge port in register with the tapered discharge end of the first mentioned nozzle, said second nozzle being arranged when turned with respect to said external section to vary the relationship of said port to said first nozzle, and said external section being arranged to turn with respect to the internal section without affecting the relationship of said port to said first nozzle.

2. In a liquid spraying device as set forth in claim 1, the provision of a ring element secured to said external section providing an end thrust bearing for said plug element whereby to retain said internal section fixed in a determined endwise relationship with respect to the external section.

3. In a liquid spraying device as set forth in claim 1, wherein the second named nozzle is of a two part construction, namely an inner portion swiveled to the external section and arranged when turned with respect thereto to communicate endwise movement bodily to said nozzle, and an outer discharge portion connected to the inner portion, said portions having a plate fixed therebetween by the connection of said portions with one another and providing the discharge port therein to be controlled by the first named nozzle as described.

4. In a spray mist washing apparatus, the combination with a flexible liquid conduit and a flexible air conduit, of an elongated stiff handle section communicating with one flexible conduit, a spray nozzle on the outer end of said handle and laterally directed with respect thereto, said handle being swiveled with respect to the said conduit to permit turning the same relative thereto to point the spray nozzle in any desired direction, and an internal nozzle in the handle communicating with the other conduit, said internal nozzle being arranged to control the discharge through a port communicating with the spray nozzle and being maintained normally in a predetermined position with respect to said handle, said spray nozzle being swiveled with respect to said handle, by means of a pin and bayonet slot connection between the spray nozzle and handle, whereby said spray nozzle is arranged when turned to vary the relation between the port and the internal nozzle whereby to vary the discharge through said port.

5. A spray device comprising an internal nozzle, a supply conduit communicating therewith, a casing member thereabout, a second supply conduit connected to the latter, and an external spray nozzle on the end of said casing member laterally directed with respect thereto and having a port arranged to be controlled by the internal nozzle, said casing being arranged to swivel freely relative to the internal nozzle so as to direct the external nozzle in any direction without affecting the character of the spray, and said external nozzle being adjustable endwise on said casing member to adjust its port toward and away from the internal nozzle to vary the spray as desired.

6. A spray device comprising an internal nozzle, a supply conduit communicating therewith, a casing member thereabout, a second supply conduit connected to the latter, and an external spray nozzle on the end of said casing member laterally directed with respect thereto and having a port arranged to be controlled by the internal nozzle, said casing being arranged to swivel relative to the internal nozzle so as to direct the external nozzle in any direction without affecting the character of the spray, and said external nozzle having a pin and bayonet slot swivel connection with the casing and arranged when turned slightly with respect thereto to appreciably adjust its port with respect to the internal nozzle and thereby vary the spray.

7. In a liquid spraying device, an external stiff tubular section serving as a handle as well as a conduit, an internal tubular conduit, a hollow elongated plug element connected at its inner end with the internal conduit, said plug element having a spider portion at each end thereof for coaxially aligning the plug and the internal conduit within the handle, and one of the spider portions being received in a bearing provided therefor in the handle to permit the turning of the one part relative to the other, a nozzle mounted on the outer end of said plug and having a tapered discharge end, and a second nozzle swiveled on the handle and providing a discharge port in register with the tapered discharge end of the first mentioned nozzle.

8. A liquid spraying device comprising a flexible liquid conduit, a flexible air conduit, said conduits being disposed one inside the other and having communication with sources of liquid and air supply, end sections of stiff conduit connected with said first mentioned conduits and disposed one inside the other to provide a portion to serve as a handle in using said device, the external section being swiveled to its connecting conduit and the internal section being held centrally disposed with respect to the external section at its outer end to provide an annular passageway thereabout inside said external section, an internal nozzle on the outer end of said internal section, and an external nozzle on the outer end of said external section providing a central port to be controlled by said internal nozzle, said external nozzle being swiveled with respect to said external section and arranged when turned with respect thereto to vary the discharge through said port.

9. In a spraying device, the combination of a flexible conduit serving as an extension hose to lead to the work, another flexible conduit extending inside the first conduit, the one serving as an air conduit and the other as a material conduit, a handle connected with the outer end of the first conduit and arranged to swivel relative thereto, means to maintain the end of the second conduit centrally disposed within said handle and in a predetermined endwise relationship therewith while permitting turning of the handle with respect thereto, an internal nozzle mounted on the end of the second conduit, and an external nozzle on the end of the handle providing a port to be controlled by the internal nozzle, said external nozzle being rotatable with respect to the handle but being arranged when turned to adjust its relation to the internal nozzle to vary the discharge through said port.

10. In a spray device, the combination of a pair of flexible conduits, the one serving as an air conduit and the other as a material conduit, a stiff end section for the one conduit having a laterally directed spray nozzle on the outer end thereof, said section serving as a handle for directing the spray and being swiveled with respect to said conduit in order to point the spray nozzle in any desired direction, the other conduit being extended through said handle and held centrally disposed with respect thereto as well as against endwise movement relative thereto, and an internal nozzle on the outer end of the second conduit arranged to control a central port provided for the spray nozzle, said spray nozzle being swiveled with respect to the handle and arranged when turned with respect thereto to vary the discharge through said port.

In witness of the foregoing I affix my signature.

JOHN H. TRITZ.